United States Patent [19]
Filipovich et al.

[11] Patent Number: 5,254,852
[45] Date of Patent: Oct. 19, 1993

[54] HELMET-MOUNTED NIGHT VISION SYSTEM AND SECONDARY IMAGER

[75] Inventors: Danny Filipovich, Lincolnwood; Jack Fiore, Lake Barrington, both of Ill.

[73] Assignee: Night Vision General Partnership, Morton Grove, Ill.

[21] Appl. No.: 890,660

[22] Filed: May 28, 1992

[51] Int. Cl.⁵ .................. H01J 31/50; G01V 9/02
[52] U.S. Cl. .................. 250/214 VT; 250/221
[58] Field of Search ........... 250/213 VT, 221, 216, 250/208.1, 207, 214 VT; 359/353; 313/523–530; 340/784

[56] References Cited

U.S. PATENT DOCUMENTS

| | | | |
|---|---|---|---|
| 3,787,688 | 1/1974 | Stone | 250/213 VT |
| 4,000,419 | 12/1976 | Crost et al. | 250/213 VT |
| 4,449,787 | 5/1984 | Burbo et al. | 313/524 |
| 4,463,252 | 7/1984 | Brennen et al. | 250/213 VT |
| 4,468,101 | 8/1984 | Ellis | 350/538 |
| 4,563,061 | 1/1986 | Ellis | 350/503 |
| 4,660,943 | 4/1987 | Ellis | 350/538 |
| 4,697,783 | 10/1987 | Kastendieck et al. | 250/213 VT |
| 4,755,664 | 7/1988 | Holmes et al. | 250/213 VT |
| 4,775,217 | 10/1988 | Ellis | 350/538 |
| 4,828,378 | 5/1989 | Ellis | 313/524 |
| 4,907,296 | 3/1990 | Blecha | 2/6 |
| 4,915,487 | 4/1990 | Riddell et al. | 350/174 |
| 4,918,752 | 4/1990 | Briggs | 2/6 |
| 4,922,550 | 5/1990 | Verona | 2/6 |
| 4,934,793 | 6/1990 | Klein | 350/345 |
| 4,987,608 | 1/1991 | Cobb | 2/6 |
| 5,079,416 | 1/1992 | Filipovich | 250/213 VT |
| 5,093,567 | 3/1992 | Staveley | 250/221 |

FOREIGN PATENT DOCUMENTS 0066402 12/1982 European Pat. Off. .
3-369937 12/1991 Japan .................. 313/525

OTHER PUBLICATIONS

Muehllehner, "Image Intensifier Scintillation Cameras For Nuclear Medicine Applications", SPIE vol. 78 (1976) pp. 113–117.
Two-page brochure entitled "Modular, Ejection-Rated, Lowprofile, Imaging for Night (MERLIN) Aviator Goggle," published by ITT Defense Technology Corporation (1989).

Primary Examiner—David C. Nelms
Assistant Examiner—Michael Messinger
Attorney, Agent, or Firm—Willian Brinks Olds Hofer Gilson & Lione

[57] ABSTRACT

A helmet-mounted night vision system that is compact, light in weight and ejection-safe. The system incorporates a night vision goggles apparatus for receiving incoming infrared and/or visible light from a viewed object and for converting the incoming light to an intensified visible light for presentation to an eye of a user, a visor mounted to a helmet to be worn by the user and adapted to be positioned in front of the night vision goggles apparatus, and connecting structure for connecting the visor to the night vision goggles apparatus for retaining the visor in position in front of the night vision goggles apparatus. By ensuring that the visor is safely retained in front of and substantially fully covers the goggles apparatus at all times, the system of the invention is rendered ejection-safe. The system also provides the user with numerous other structural and operational advantages.

20 Claims, 4 Drawing Sheets

HELMET-MOUNTED NIGHT VISION SYSTEM AND SECONDARY IMAGER

BACKGROUND OF THE INVENTION

1. Field of the Invention

The present invention relates generally to a night vision system of the type which permits vision under very low light conditions by converting incoming infrared and/or visible light from a viewed object to an intensified visible light. More particularly, the present invention relates to a helmet-mounted night vision system that is compact, light in weight and ejection-safe; and which provides the user with numerous additional structural and operational advantages.

2. Background Art

Night vision goggles are commonly used by aircraft pilots and others to permit vision under very low light conditions by converting incoming infrared and/or visible light from a viewed object to an intensified visible light.

Prior night vision goggles were typically heavy, cumbersome and unstable. They often resembled television cameras mounted on the user's head, protruding more than 175 millimeters from the user's eyes, and weighing as much as 850 grams. The weight and front-to-back length of such systems exerted large moments on the user's head, causing serious instability problems and prevented their safe use in many applications where the user's head was likely to be subjected to high gravitational or centrifugal loads. In emergency situations, for example, when ejecting from an aircraft, there was often not sufficient time to remove the goggles before ejection; and the very substantial forces encountered during the ejection were extremely dangerous to the user.

Night vision goggles are frequently mounted to a helmet adapted to be worn by the user. Helmet-mounted goggles avoid the discomfort sometimes encountered when the goggles are attached directly to the head of the user, and provide various other advantages; however, prior helmet-mounted systems also suffer from several inadequacies. For example, in many systems, the structure of the goggles obstructs the user's normal peripheral vision, and thus reduces his field of view. Many systems also interfere with the proper use of a visor which should generally be positioned in front of the eyes at all times, and other necessary equipment such as an oxygen mask or the like. Many systems are also rather complicated in design, difficult to adjust and generally inconvenient to use.

SUMMARY OF THE INVENTION

The present invention provides a night vision system adapted to be mounted to the helmet of a user that is compact, light in weight and ejection-safe and that provides numerous additional structural and operational advantages over existing night vision systems.

A night vision system according to the present invention comprises night vision goggles apparatus for receiving incoming infrared and/or visible light from an object and for converting the incoming light to an intensified visible light for presentation to an eye of a user, a visor mounted to a helmet to be worn by the user and adapted to be positioned in front of the night vision goggles apparatus, and connecting means for connecting the visor to the night vision goggles apparatus for retaining the visor in position in front of the night vision goggles apparatus.

With the present invention, the night vision goggles apparatus and the helmet-mounted visor cooperate with one another to ensure that the visor will remain in position in front of the goggles apparatus and in front of the user's face, even during the extreme forces encountered during ejection from an aircraft, and thus help protect the user if the goggles apparatus is worn during the ejection.

In accordance with a presently preferred embodiment, the goggles apparatus is also mounted to the helmet, and the visor is configured to extend over and substantially fully cover the night vision goggles apparatus except for a small portion of objective optical systems of the goggles apparatus. The night vision system of the invention thus provides a streamlined shape presenting minimal wind resistance so as to reduce the risk of injury to the user even during an ejection.

According to a presently preferred embodiment, the connecting means comprises releasable connecting means on the visor and the goggles apparatus for releasably retaining the visor in a down position in front of the goggles apparatus while permitting the visor to be raised up out of the way when desired.

In accordance with a further aspect of the invention, the night vision goggles apparatus includes first and second housings adapted to substantially cover the left and right eyes, respectively, of the user when the apparatus is worn, each containing an optical imaging system for presenting an intensified visible image of a viewed object to the eyes of the user. The optical imaging systems each include an objective lens system having a light input positioned above the eyes and adjacent a side of the face behind a vertical plane through the eyes so as to not obstruct or otherwise interfere with the normal peripheral vision of the user.

The housings are mounted to a support which includes an adjustment bridge containing various adjustments to precisely fit the goggles apparatus to the requirements of an individual user.

The optical imaging systems may be of either non-see-through or see-through type and are designed as non-exit pupil forming systems. This is distinguished from some prior systems in which an aerial intensified image of the object is established at an exit pupil and the eye must be positioned precisely in the exit pupil for proper viewing of the intensified image.

According to a yet further embodiment, the night vision system of the present invention includes a secondary imager comprising a liquid crystal module affixed at the output end of an image intensifier tube of one optical imaging system for injecting symbology or other indicia into the system. The liquid crystal module contains a liquid crystal display on a clear glass substrate and functions as an electronic shutter such that when activated, the LCD display will provide black indicia superimposed upon the bright background provided at the output of the image intensifier tube that can easily be seen by the user. When the display is not in use, the module becomes fully transparent so as to not interfere with the intensified image from the output of the image intensifier tube. The liquid crystal module secondary imager avoids the necessity of adding additional optical components to the optical imaging system to inject secondary images thereinto with the resultant increase in size and complexity attendant thereto.

Yet further advantages and specific details of the invention will become apparent hereinafter in conjunction with the following detailed description of presently preferred embodiments.

DETAILED DESCRIPTION OF PREFERRED EMBODIMENTS

Figure 1:
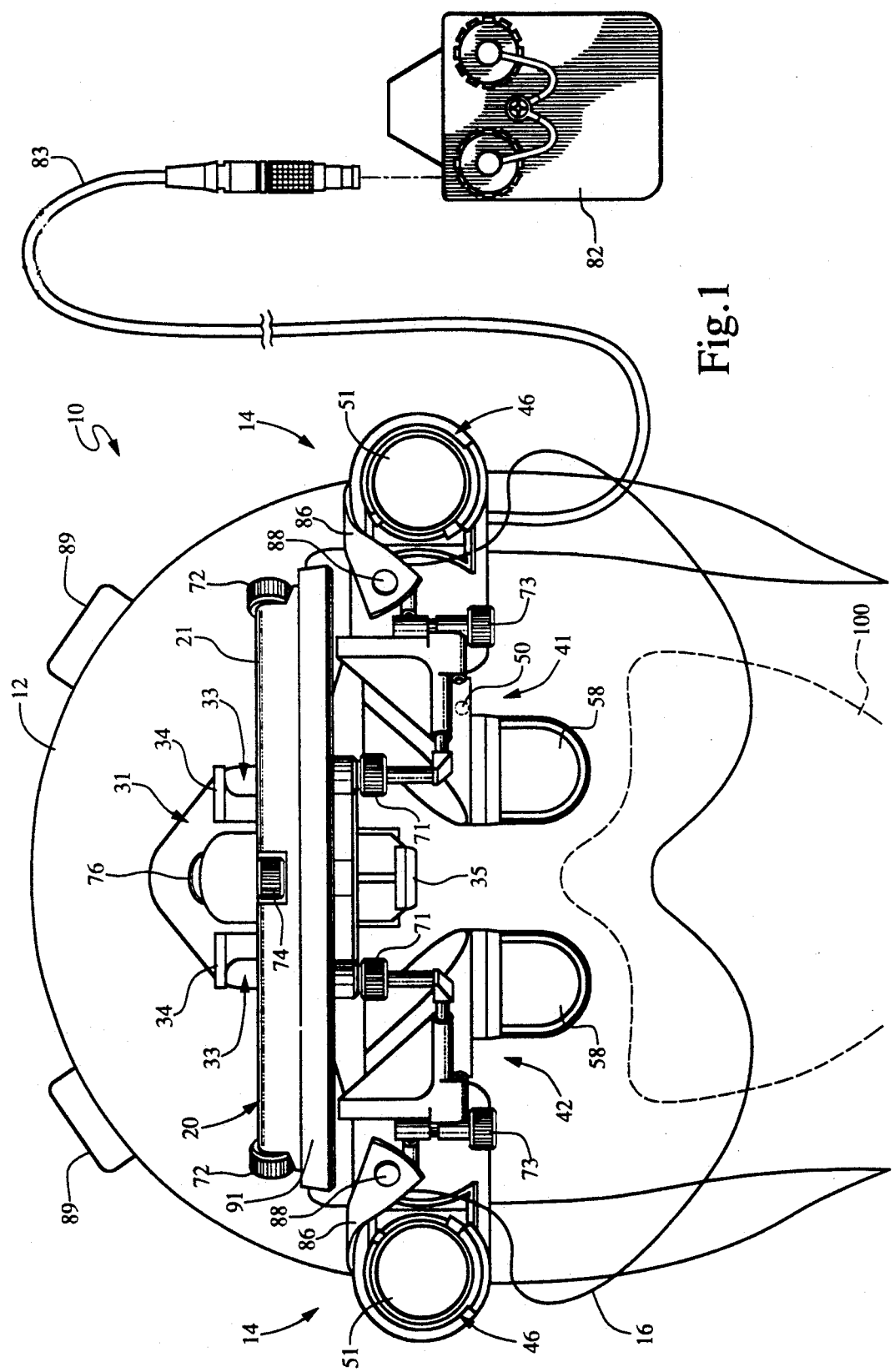
FIG. 1 is a front view of a helmet-mounted night vision system according to a presently preferred embodiment of the invention.
Figure 2:
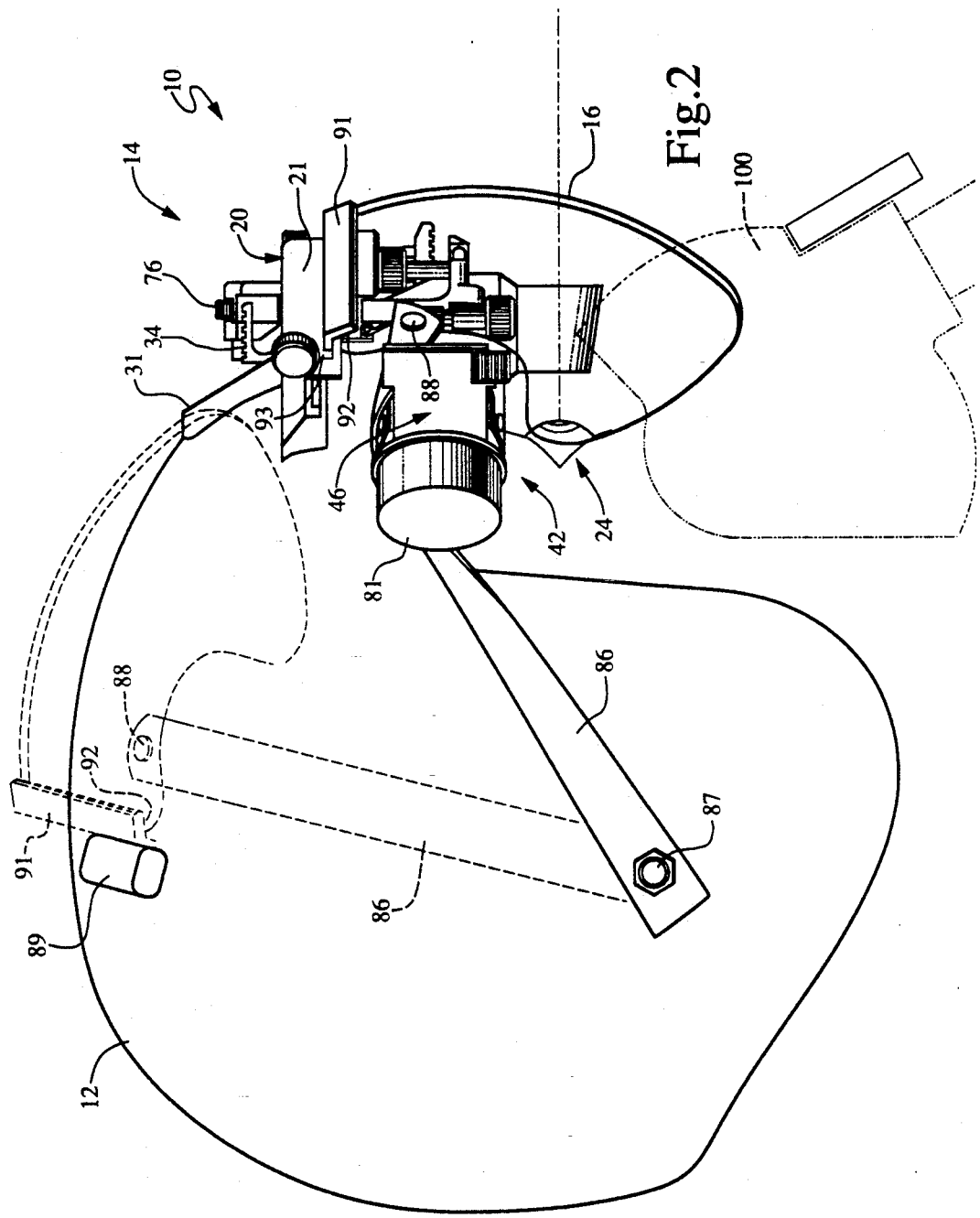
FIG. 2 is a right side view of the night vision system of FIG. 1.
Figure 3:
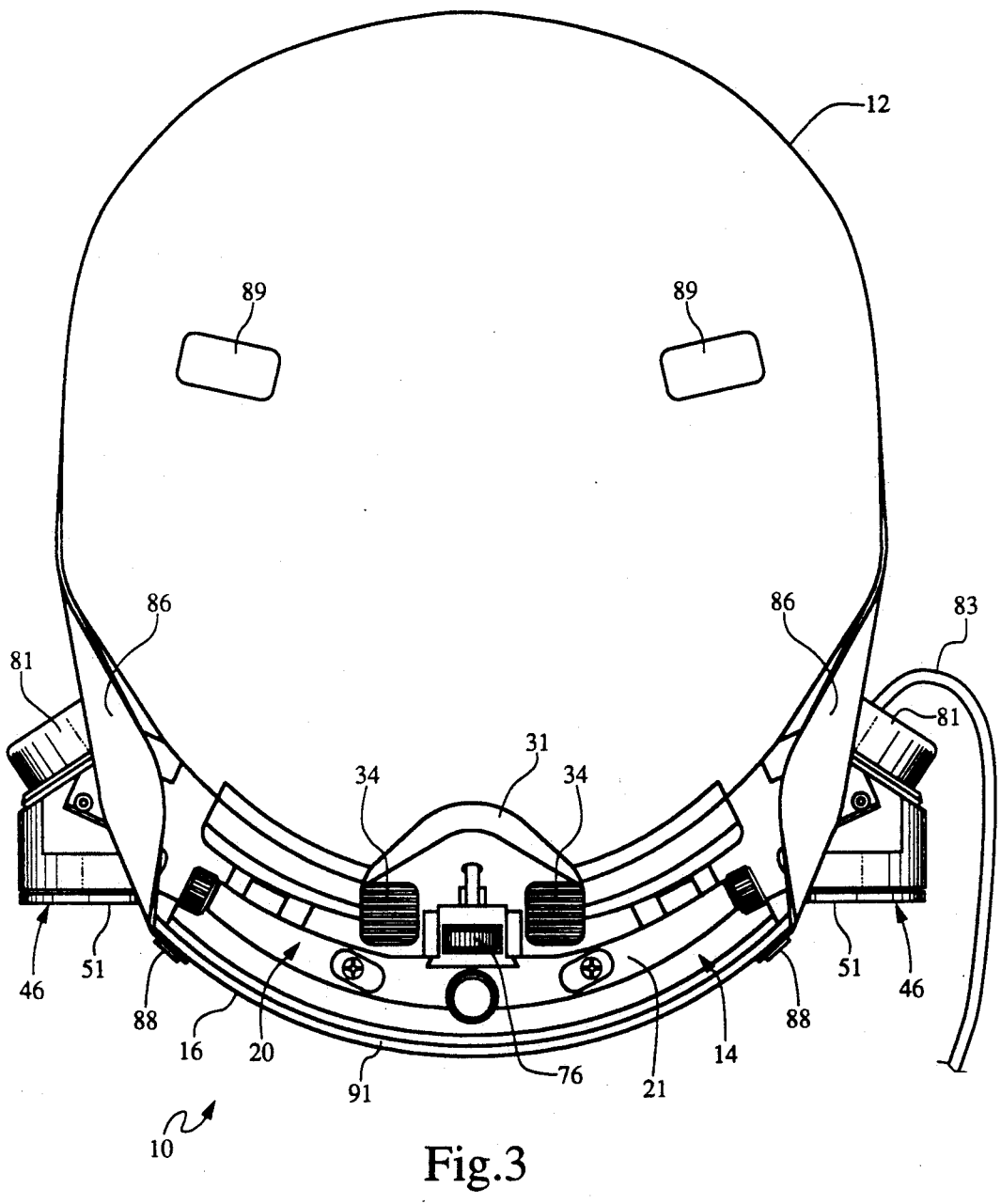
FIG. 3 is a top view of the night vision system of FIGS. 1 and 2.

FIGS. 1-3 are front, side and top views, respectively, illustrating a helmet-mounted night vision system according to a presently preferred embodiment of the invention. The overall system is designated by reference number 10 and is adapted to be mounted to a helmet 12 which may be of conventional type as commonly worn, for example, by pilots of high-performance aircraft and others. As will be explained hereinafter, night vision system 10 generally comprises a night vision goggles apparatus 14 and a visor 16, each of which are adapted to be separately mounted to helmet 12.

Night vision goggles apparatus 14 comprises a supporting structure generally designated by reference number 20 which supports a pair of housings 41 and 42 arranged to cover the left and right eyes, respectively, of the user. Each of the housings carries an optical imaging system designed to receive infrared and/or visible light from an external object and to present an intensified visible image of the object to its respective eye of the user.

Figure 4:
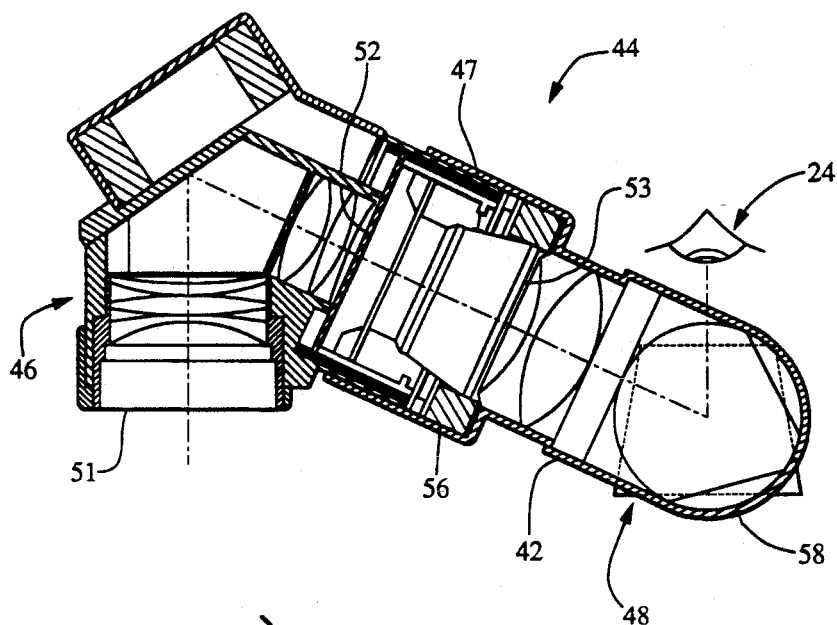
FIG. 4 schematically illustrates an optical imaging system of the night vision system of FIGS. 1-3.

The optical imaging systems in housings 41 and 42 are substantially mirror duplicates of one another and, as shown in FIG. 4 (which schematically illustrates an optical imaging system 44 in right eye housing 42), include an objective optical system 46, an image intensifier tube 47, and an eyepiece optical system 48. It should be recognized that the specific optical design of the objective and eyepiece optical systems can be varied in numerous ways as is known by those skilled in the art, and FIG. 4 is intended to be exemplary only of a suitable design.

Objective lens system 46 is adapted to collect infrared and/or visible light from an external object at an input end 51 thereof and to present an image of the object to the input end or photocathode side 52 of the image intensifier tube 47. The image intensifier tube converts the image at the input end thereof to an intensified visible image in a narrow band of wavelengths at the output end 53 thereof.

In a preferred embodiment, the image intensifier tube includes a GaAs photocathode at the input end, and the output light from the image intensifier is emitted by a green phosphor producing a visible band of light which is known as "P-20" light, although it will be appreciated that other image intensifier constructions could also be used if desired.

The intensified, visible image at the output 53 of the image intensifier tube is applied to the eyepiece optical system 48 which presents an intensified visible image of the object to the eye 24 of the user.

As best shown in FIGS. 1 and 3, the objective optical systems 46 in housings 41 and 42 are positioned such that the inputs 51 thereof face forwardly and are located at positions above the eyes and adjacent the sides of the user's face behind a vertical plane through the eyes when the goggles are being worn; and the optical imaging systems 44 are designed to generally follow the contours of the user's face such that the output of the eyepiece optical systems 48 thereof are positioned in front of the eyes.

Figure 5:
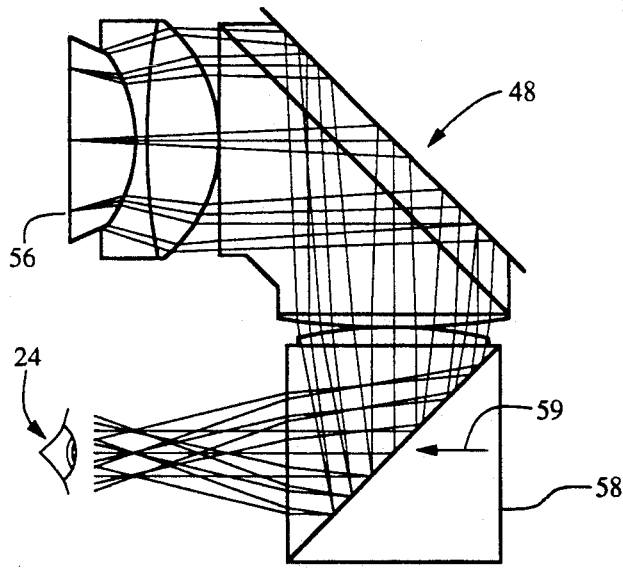
FIG. 5 illustrates the eyepiece optical system of the imaging optical system of FIG. 4 in greater detail.

The eyepiece optical system 48 in each housing, which is illustrated in greater detail in FIG. 5, receives the intensified visible image of the object at the input end 56 thereof, and turns the image downwardly and inwardly into an eye 24 of the user.

The eyepiece optical system of the present invention can be of either the "non-see-through" type in which only an intensified visible image of an external object is presented to the eyes of the user, or of the "see-through" type wherein both an intensified image and an unintensified visible image of the object are presented to the eyes of the user. The eyepiece optical system 48 of FIG. 5 is of the "see-through" type such that visible light from the object enters into the system at input face 58 and is also directed to the eye 24 of the user as indicated by arrow 59.

The design of the optical imaging systems 44 of the night vision goggles apparatus of the present invention, and particularly the positions of the objective optical systems 46, are such that they do not interfere with the user's normal peripheral vision. This is an important feature inasmuch as in many prior night vision systems, the position of the optical structures thereof are such that they block normal peripheral vision to a significant extent thus severely restricting the user's field of view.

A further important aspect of the present invention is that the optical imaging system 44 is a non-exit pupil forming system. In particular, in the present invention, the output face 53 of the image intensifier tube 47 is a diffusing surface such that the intensified visible image of the object thereat functions as an image source to the eyepiece optical system 48. In some prior systems, an optical relay is positioned after the image intensifier tube which creates an aerial or virtual image of the object (at an exit pupil), and the eye must be positioned precisely in the exit pupil to properly see the image.

As indicated previously, optical imaging systems 44 are generally configured to follow the contour of the user's face so as to be positioned closely adjacent to the user's face. To provide an upright image of the viewed object to the eyes of the user, the systems are each provided with means for introducing a sixty-four degree image rotation. In accordance with the preferred embodiment, this is accomplished by introducing an appropriate twist in a fiber optic bundle positioned in the image intensifier tube between the input and output ends thereof. Preferably also, in the "see-through" version of the system of the present invention, the fiber optic bundle in the image intensifier tube is additionally fanned out from the input end to the output end thereof as schematically shown in FIG. 4 to expand the beam passing through the bundle to provide a magnified visible image at the output end of the image intensifier tube and to present an intensified visible image to the eyes of the user at unity magnification. The fiber optic beam expander and its function is described in greater detail in copending, commonly assigned application Ser. No. 07/827,339 which is incorporated herein by reference.

As indicated previously, housings 41 and 42 of night vision goggles apparatus 14 are supported by a supporting structure 20; and structure 20 includes mounting structure for releasably mounting the goggles to helmet 12. More particularly, helmet 12 includes a mounting receiver 31 affixed to the front thereof which includes mounting means which is adapted to be engaged by a latching mechanism 33 carried by the supporting structure 20. The latching mechanism is designed such that the goggles apparatus may be quickly released from the mounting receiver by simultaneously pressing down on two latch release members 34. The requirement of pressing down on two latch release members to release the goggles apparatus from the helmet provides a fail-safe feature to reduce the risk of accidental release of the goggles apparatus. A thumb pad 35 is provided for being pressed against by the thumb while two fingers press down on the latch release members.

The supporting structure 20 also includes an adjustment bridge 21 which carries the various structures of the goggles apparatus and which contains various adjustment mechanisms for fitting the night vision goggles apparatus to a particular user. For example, reference number 71 identifies left and right vertical bias adjustment knobs by which the housings 41 and 42 for the left and right eyes, respectively, can be individually adjusted up or down; and reference number 72 identifies left and right interpupillary distance adjustment knobs to individually adjust the interpupillary distance between the housings. These adjustments permit the outputs of the eyepiece optical systems of each housing to be precisely aligned with their respective eyes of the user.

Knobs 73 comprise left and right tilt controls to individually adjust the tilt of the optical imaging systems of each housing to provide for a 100 percent overlap of the fields of view seen by the two eyes, which is highly desirable in a binocular imaging system. Knob 74 comprises a vertical adjustment knob which moves the adjustment bridge up or down to adjust the vertical position of housings 41 and 42 together, and knob 76 (best shown in FIGS. 2 and 3) comprises a combined fore and aft control for controlling the horizontal position of the housings relative to the eyes and face of the user.

In general, the adjustment bridge 21, by containing all the various adjustment controls for the goggles apparatus, simplifies the adjustment procedure and permits the user to quickly and easily adjust the apparatus to his particular needs.

A power supply 81 is preferably mounted to each of the housings 41 and 42 to provide power to the image intensifier tubes, and are connected to a shirt-pocket type battery pack 82 via a shielded cord 83 as shown in FIG. 1. A low battery indicator 50 is provided on the goggles apparatus to indicate a low battery condition.

As indicated previously, night vision system 10 of the present invention includes both the night vision goggles apparatus 14 and visor 16. Visor 16 is mounted to helmet 12 by a pair of flexible straps 86. One end of each of the straps is attached to a side of the helmet by a fastener 87 and the other end of each of the straps is attached to an upper corner of the visor by a fastener 88.

As shown in FIGS. 1 and 2, visor 16 is movable between a raised position shown in dotted line in FIG. 2, and a down position shown in solid line in FIGS. 1 and 2 positioned in front of the eyes 24 of the user. A pair of stops 89 are affixed to the helmet 12 to define the up position of the visor.

Visor 16 includes interengaging structure comprising a retaining member 91 affixed to and extending across the upper edge thereof and defining a downwardly extending groove 92. When the visor is moved to its down position, retaining member 91 is received within interengaging structure on the goggles apparatus comprising a slot 93 formed in adjustment bridge 21 as shown in FIG. 2, and snaps in place in slot 93 to retain the visor in its down position. In addition, the visor is shaped to define a pair of cutout sections 94 on each side thereof through which the portions of housings 41 and 42 containing the input ends of objective optical systems 46 extend when the visor is in its down position. As shown in the Figs., when the visor is in its down position, straps 86 extend over and around the housing portions to further assist in retaining the visor in its down position in front of the eyes of the user.

When the visor is in its down position, substantially the entire night vision goggles apparatus is covered by the visor, and only the small portion of housings 41 and 42 surrounding the input ends of the objective optical systems therein are exposed. This is desirable so that the light entering into the optical imaging systems to be intensified does not have to pass through the visor as this will reduce the quality of the intensified images seen by the eyes.

The overall configuration of the night vision system 10 of the present invention, including the goggles apparatus 14 and the visor 12, provides a highly streamlined shape that minimizes wind resistance so as to permit the system to be safely worn even during ejection from an aircraft. Furthermore, because the visor is securely connected to the goggles apparatus in its down position, the visor will remain in place and not be unintentionally pushed up to uncover the goggles apparatus during ejection to further ensure the safety of the user during ejection. The visor can, of course, be intentionally moved to its up position simply by pushing it up against the retention force of the slot 93.

As shown in FIGS. 1 and 2, the night vision system of the present invention does not interfere with the use of an oxygen mask 100 as is usually worn by pilots and others in high performance aircraft.

As known to those skilled in the art, night vision systems frequently incorporate structure for injecting indicia or another secondary image into the intensified light path to be presented to an eye of the user. Typically, the secondary image injection structure includes additional optical components including prisms or the like for injecting a secondary image from an external secondary image source into the optical imaging system, and such additional structure further complicates the overall system and increases its size and weight.

Figure 6:
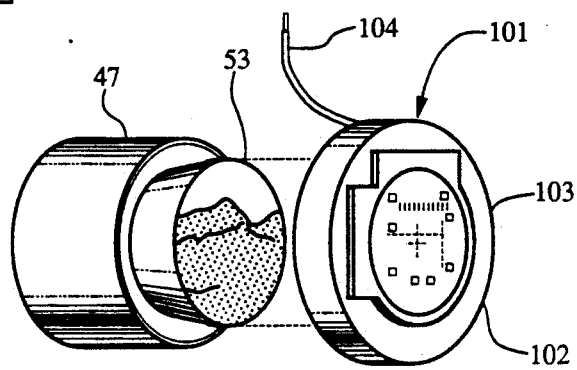
FIG. 6 schematically illustrates an alternative embodiment of the present invention for injecting a secondary image into the night vision system of the invention.

FIG. 6 illustrates an alternative embodiment of the present invention wherein indicia or another secondary image can be provided to the user without requiring an additional set of imaging optics. More particularly, as shown in FIG. 6, a liquid crystal module 101 is affixed at the output end 53 of the image intensifier tube 47. Module 101 contains a liquid crystal display 103 on a clear glass substrate 102 and appropriate miniaturized driver electronics therefor. The module functions as an electronic shutter such that, when activated, the LCD display will provide black indicia 103 which can be easily seen by the user as a result of the bright background provided by the intensified light from the image intensifier tube passing through the clear substrate. When it is not activated, the LCD display becomes fully transparent so as to not block or otherwise interfere with the intensified image passing therethrough. Even when the display is activated, it will interfere with the intensified visible image from the image intensifier tube only slightly such that the image can still be seen by the eye; and, in any event, the display is typically provided only to one eye of the user such that the other eye will always see a fully unblocked image. The display can also be effectively used in daylight because of the ability to pump light to the LCD display. A cable 104 is attached to module 101 to input video information to the module.

Other forms of displays can also be used rather than an LCD display. For example, a vacuum fluorescent display mounted to the output end of the image intensifier tube could also be utilized, if desired.

While what has been described constitute presently preferred embodiments, it should be understood that the invention could take numerous forms other than those specifically described herein. Accordingly, it should be understood that the invention is to be limited only insofar as is required by the scope of the following claims.

We claim:

1. A night vision system comprising:
    night vision goggles apparatus adapted to be positioned substantially in front of a user's face for receiving incoming light from an object and for converting the incoming light to an intensified visible light for presentation to an eye of the user;
    a visor mounted to a helmet to be worn by the user and adapted to be positioned substantially in front of the night vision goggles apparatus relative to the user's face such that the night vision goggles apparatus is generally positioned between the visor and the user's face; and
    connecting means on said night vision goggles apparatus and on said visor for connecting the visor to the night vision goggles apparatus for retaining the visor in position substantially in front of the night vision goggles apparatus relative to the user's face and for retaining said night vision goggles apparatus generally between said visor and the user's face.

2. The night vision system of claim 1 wherein said connecting means comprises interengaging structure on said night vision goggles apparatus and on said visor.

3. The night vision system of claim 2 wherein said interengaging structure comprises a retention member on said visor and means for defining a slot on said night vision goggles apparatus for releasably retaining said retention member on said visor.

4. The night vision system of claim 2 and further including a pair of straps for mounting said visor to said helmet, and wherein said pair of straps are adapted to extend around portions of said night vision goggles apparatus when said visor is positioned substantially in front of said goggles apparatus relative to the user's face to further assist in retaining the visor in position substantially in front of the goggles apparatus relative to the user's face.

5. The night vision system of claim 4 wherein said visor includes cutout portions through which said portions of said night vision goggles apparatus are adapted to extend when said visor is positioned substantially in front of said goggles apparatus relative to the user's face.

6. The night vision system of claim 1 and further including means for releasably mounting said goggles apparatus to said helmet.

7. The night vision system of claim 1 wherein said night vision goggles apparatus includes first and second housings for covering left and right eyes, respectively, of the user, each of said first and second housings including an optical imaging system which includes an objective lens system for receiving incoming light from an object at an input thereof and for directing the incoming light to an input end of an image intensifier tube, an image intensifier tube for converting the image at the input end thereof to an intensified visible image at the output end thereof, and an eyepiece optical system for presenting the intensified visible image at the output end of the image intensifier tube to an eye of the user, and wherein said input of said objective optical system is located at a position above the eyes of the user and adjacent a side of the face of the user at a position so as not to interfere with the peripheral view of the user.

8. The night vision system of claim 7 wherein said visor includes cutout portions thereon through which portions of said housing containing the inputs of said objective optical systems are adapted to extend when the visor is in position in front of the night vision goggles apparatus relative to the user's face.

9. Night vision goggles apparatus comprising:
    first and second housing adapted to be positioned substantially in front of a user's face for substantially covering left and right eyes, respectively, of the user, each of said first and second housings including an optical imaging system for receiving light from an external object and for presenting an intensified visible image of said object to its respective eye, each of said optical imaging systems being positioned adjacent to and generally following contours of the user's face and including
    an objective optical system having an input end for receiving said light from said external object and for providing an image of said object at an output end thereof, said input end of said objective optical system being positioned at a location above the eyes of the user and adjacent a side of the user's face;
    an image intensifier tube for converting the image at the output end of the objective optical system to an intensified visible image of the object at an output end of the image intensifier tube; and
    an eyepiece optical system for receiving the intensified visible image at the output end of the image intensifier tube and for presenting the intensified visible image to a respective eye of the user.

10. The night vision goggles apparatus of claim 7 wherein said optical imaging system in each of said first and second housings is positioned adjacent to and generally follows contours of the face of the user.

11. The night vision goggles apparatus of claim 9 and further including a support structure for supporting said first and second housings, said support structure including an adjustment bridge containing means for adjusting the positions and orientations of the first and second housings to properly fit the user.

12. The night vision goggles apparatus of claim 9 and further including connecting means thereon for connecting said goggles apparatus to a visor mounted to a helmet adapted to be worn by the user.

13. The night vision goggles apparatus of claim 12 wherein said connecting means includes means for releasably engaging connecting structure on said visor.

14. The night vision goggles apparatus of claim 12 and further including means for releasably mounting said goggles apparatus to said helmet.

15. The night vision goggles apparatus of claim 9 and further including secondary imager means adjacent the output end of said image intensifier tube for providing a secondary image to the respective eye of the user.

16. The night vision goggles apparatus of claim 15 wherein said secondary imager means comprises a liquid crystal display module affixed to the output end of the image intensifier tube.

17. Night vision apparatus comprising:
  an objective optical system having an input end for receiving light from an external object and for providing an image of said object at an output end thereof,
  an image intensifier tube for converting the image at the output end of the objective optical system to an intensified visible image of the object at an output end thereof;
  a secondary imager positioned adjacent the output end of said image intensifier tube for providing a secondary image adjacent the output end of the image intensifier tube; and
  an eyepiece optical system for receiving the intensified visible image at the output end of the image intensifier tube and the secondary image from the secondary imager and for presenting the intensified visible image and the secondary image to an eye of the user.

18. The night vision apparatus of claim 17 wherein said secondary imager comprises a display module affixed to the output end of the image intensifier tube.

19. The night vision apparatus of claim 18 wherein said display module comprises a liquid crystal display module.

20. The night vision apparatus of claim 19 wherein said liquid crystal display module includes a liquid crystal display on a transparent substrate.

* * * * *